Feb. 27, 1973 KARL-HEINZ MULLER 3,718,914

DATA STORAGE SYSTEM UTILIZING PARTICLE BEAM FOR READING INFORMATION

Filed Jan. 22, 1970

7 Sheets-Sheet 5

United States Patent Office 3,718,914
Patented Feb. 27, 1973

3,718,914

DATA STORAGE SYSTEM UTILIZING PARTICLE BEAM FOR READING INFORMATION

Karl-Heinz Müller, Berlin, Germany, assignor to Siemens Aktiengesellschaft, Berlin and Munich, Germany Filed Jan. 22, 1970, Ser. No. 4,914
Claims priority, application Germany, Feb. 3, 1969, P 19 05 894.7
Int. Cl. G11c *11/26, 11/42*
U.S. Cl. 340—173 CR 9 Claims

ABSTRACT OF THE DISCLOSURE

A data storage system comprises a particle beam which scans the data and a storage layer transparent to the beam. The storage layer has markings each of which represents a corresponding data element. Electron beam deflecting means are arranged in the beam direction ahead of the storage layer. A detector device is provided behind the storage layer. The cross-section of the beam in the plane of the storage layer is such that it penetrates one component block of the storage layer having a plurality of markings, and projects the same enlarged onto the plane of the detector device. The detector device is designed so that it reads the markings of the penetrated block, separately.

DESCRIPTION OF THE INVENTION

The invention relates to a data storage system. More particularly, the invention relates to a data storage system utilizing a particle beam for reading information.

In the data storage system of the invention, a particle or electron beam is utilized to read the data or information stored in a storage layer. The storage layer is transparent and has markings which represent data elements. The data storage system of the invention further comprises deflection means for the electron beam. The deflection means are positioned in the direction of the electron beam, ahead of the storage layer, and deflect the beam to predetermined regions or areas of the storage layer. A detector system is positioned in the direction of the electron beam behind the storage layer.

Known solid state or semiconductor information or data memories such as, for example, capacitively coupled matrix devices in which information or data is stored in the form of perforated metal foils, have the advantage of a brief access period. Their storage capacity, however, is limited, due to expense, and is too small for many purposes. On the other hand, however, there are memories such as, for example, magnetic tapes, which have a high storage capacity, and of which the cost is low. These cannot be utilized in many cases, due to their long access periods. In non-numerical methods, particularly, that is, when the language is converted into writing, it is necessary to utilize data systems which have a high storage capacity as well as a brief access period, and whose cost is tolerable. Thus, for example, storage capacities in the order of magnitude $10^7$ bits and access times of less than one-tenth of a millisecond are desired, having a cost for each stored bit which is considerably less than that required at the present time.

U.S. Pats. Nos. 3,170,083 and 3,278,679 disclose the utilization of the advantageous qualities of electron-optical systems for data storage. These patents disclose apparatus for storing and reading stored information or data. The apparatus utilizes electron microscopy to provide the electron beam and the electron deflection beams. The reading of the data utilizes a mirror microscopy projection utilizing the electron beam and is effected either by avoiding irradiation of the storage layer or by utilizing an electron beam to produce a projection of the type utilized in conventional irradiation microscopy. The scanning of the individual markings which represent a data element is common for both methods. The markings are scanned individually and sequentially on the storage layer, by means of the reading electron beam, similarly to the conventional raster microscopy method. For statistical reasons, the reading of a total information comprising a plurality of such data elements is so determined with respect to the time that each marking must be irradiated for a period of time which is sufficient to enable a specific number of electrons to reach the detector device. The individual irradiation periods are thus summed up.

The invention relates to a data storage system which utilizes a particle beam for scanning or reading the data. The system of the invention differs from known systems to the extent that the cross-section of the electron beam in the plane of the storage layer is such that it penetrates a region or area of said storage layer having a plurality of markings. The electron beam projects the markings of the area of the storage layer in magnified condition onto the plane of the detector device. The detector device effects a separate reading for the image points which correspond to the individual markings of the irradiated area or block. The magnification is equal and is so selected for the projection of all the areas or blocks that the image of each area or block is specifically read or scanned by the detector device.

Thus, in known systems, the cross-section of the electron beam probe is rated so small that it scans the individual markings of the storage layer in sequence. The system of the invention, however, irradiates a region or area of the storage layer having a block of markings. The detector device is designed in a manner whereby the individual markings of the blocks are evaluated via their subordinate image points. The system and method of the invention do not produce, as in the known systems or methods, a summation of the radiation periods for the individual markings, since a block of markings is simultaneously irradiated by a particle beam, particularly an electron beam of sufficient intensity. The detector device must, of course, be able to separately store, for a brief period of time, the radiation which penetrates the individual markings. The delays caused by a change in radiation conditions of the storage layer are avoided by the irradiation of one corresponding block.

The detector device may include a component of the same type as a video camera, wherein all the image points of the irradiated block are simultaneously stored on a target and are rapidly sequentially scanned with the assistance of another particle beam. The other particle beam, which is usually an additional electron beam, scans the image points, intermediately stored in this manner, at an arbitrary speed. That is, the median flow of data of the system, in accordance with the invention, is large.

These favorable characteristics are also provided by another embodiment of the invention in which the detector device includes a matrix of semiconductor detectors arranged adjacent each other in a plane, and operating in parallel in relation to time. Such embodiment thus merely requires a reading or scanning particle beam which projects all the markings subordinate to a corresponding block or area, or a large number of blocks or areas, upon the detector device. The individual detectors of the detector device then simultaneously evaluates the individual image points.

A detector device of the aforedescribed type, in parallel operation, and therefore at a brief time output, may cause difficulties in practical application, particularly with regard to the desired storage of a plurality of data or information elements in the smallest area. This is because the detectors must usually be positioned very closely together so that the resulting spaces are too small for a relocation of the current paths for the individual detectors. This is especially true in integrated techniques and where there are a large number of detectors. The problem of small intermediate spaces between the detectors is avoided in the system of the invention by producing a magnified image of the corresponding block or area due to the selected beam passages for the particle beam, following the penetration of the storage layer. This may be accomplished for example, by producing a conventional sharp image by utilizing magnifying particle beam optical lenses in the direction of the beam behind the storage layer.

In another embodiment of the invention, which is particularly advantageous and economical, the projection of the blocks is effected during a shadow microscopic beam passage in the direction of the beam behind the storage layer, that is, without the utilization of lens components. A shadow microscopic beam passage is described, for example, by Boersch in electron microscopy, and is known to be characterized by the fact that a focusing of the irradiated particle beam, in the direction of the beam in front or behind the corresponding specimen, which, in this case, is the storage layer, produces a projection point or center which is located a short distance before or behind the specimen. A projection center which located a short distance behind the specimen usually provides better contrasts. The provided magnification thus depends exclusively upon the geometrical dimensions, that is, the distance of the projection center from the specimen, as well as the distance of the specimen from the image plane.

Even if the aforedescribed problem does not frequently occur in the system of the invention, due to the magnified image of the marking blocks and the selected size of said blocks, with respect to the size of the detector device which is available by considering the magnification scale, it may still be sensible to take such phenomenon into account in some cases. An advantage of the invention is that this problem may be solved by utilizing relatively simple means. The preferred solution is the provision of a perforated plate in the direction of the beam ahead of the detectors. The perforated plate has one whole perforation formed therethrough for each detector, whereby the markings within the individual blocks are so arranged in groups that the image points of the markings correspondingly assigned to one group coincide in sequence with the perforation assigned to the corresponding detector, at variable irradiation conditions. The irradiation conditions are adjusted in the storage layer by the deflection means. When the principle of operation is the shadow microscopic beam passage, the variable irradiation conditions may be provided by shifting the projection center diagonally to the axis of the apparatus.

In the aforedescribed embodiment of the invention, the individual blocks, which are simultaneously projected by radiation, are also divided into several groups which contain several individual markings. The markings which are combined into one group are those which are assigned or subordinated between the detectors, due to variable radiation conditions. Thus, the individual marking block contains a plurality of words. One word is represented by the image points of the markings which reach the detectors at the same time. The markings belonging to one word are positioned in the block, not directly adjacent each other, but are arranged together with the markings of the other words of the block in accordance with the following arrangement. The $p$ markings of the word are arranged adjacent each other in a row. The word comprises $q$ rows, stacked one on the other. The word thus comprises $p\ q$ data elements.

The $m-1$ markings of other words are positioned between the markings of one row assigned to one word. The $n-1$ markings of other rows are positioned between the rows having the markings of one word. Thus, each block contains $n\ m\ p\ q$ information or data elements. It is practical to provide the distribution in a manner whereby $$n=m=2^N$$

$$p=q=2^P$$

Each detector sequentially reads a group of $p\ q$ data elements adjacent each other. The arrangement of individual markings within the individual groups may be so effected that at the variable irradiation conditions, the individual markings, which are projected in direct sequence upon a detector, are not directly adjacent each other in the storage layer. Thus, for example, due to appropriate stacking, the first, third and fifth markings may be projected, and only then the second, fourth and sixth markings may be projected upon the detector. This may be accomplished in a simple manner by appropriate excitation of the deflection means. Thus, the winding currents of the deflection windings or the voltages of the electrostatic deflection plates are appropriately selected, principally by utilizing a shadow microscopic beam path, as well as by the utilization of conventional irradiation.

It is preferble to provide the storage layer with setting marks or markings assigned to the individual blocks, which produce, during the transition of the image of one block to the image of another block, setting signals in the detector device. This may be accomplished, in detail, by providing the setting marks outside the blocks in a manner whereby the image points of individual setting marks impinge upon specific detectors only under specific irradiation conditions, adjusted by the deflection members.

In order to provide the aforedescribed auxiliary adjustment, the setting marks or markings are preferably provided in addition to the markings which contain the data or information, in order to reduce the number of required detectors when solid state detectors are utilized. Specific ones of the detectors are utilized to provide setting signals. As hereinafter shown in detail, it may be preferable to deliver, during the exchange of correspondingly projected blocks, first a main address, with reference to specific setting marks, and to insure, by appropriate arrangement of the setting marks in the storage layer, that an individual irradiation of specific detectors will produce setting signals corresponding to the respective position of the storage layer.

A control signal may be obtained from the setting signals and is then supplied to the deflection means. The sub-address is supplied only after such correction. According to the sub-address, the block to be projected is adjusted via additional excitation of the deflection means.

In accordance with the present invention, a data storage system comprises a storage layer having markings representing an information element. Beam means scans the storage layer with an electron beam. Beam deflecting means between the beam means and the storage layer deflects the electron beam to predetermined areas of the storage layer. Detecting means is positioned on the opposite side of the storage layer from the deflecting means. The electron beam has a predetermined cross-section in the plane of the storage layer for crossing an area of the storage layer having a block of markings therein and projecting the block of markings in magnified condition onto the plane of the detecting means. The detecting means provides separate reading of the individual markings of the image points corresponding to the irradiated block of the storage layer. The magnification of the projected block of markings remains constant during the projection of all the blocks of markings of the storage layer and is selected so that the image of each of the blocks is specifically read by the detecting means.

The detecting means comprises a television camera having another electron beam. All the image points of the correspondingly irradiated blocks are simultaneously stored and are sequentially scanned in time by the other electron beam.

The detecting means comprises a matrix of semiconductor detectors positioned adjacent each other in a single plane and operating in parallel.

The blocks are projected in a shadow miscroscopic beam path.

The storage layer has adjusting marks corresponding to the individual blocks and the adjusting marks produce adjusting signals in the detecting means during the transition of the projection of one block to another.

A perforated plate has a hole formed therethrough for each detector of the detecting means. The perforated plate is positioned between the storage layer and the detecting means. The markings within the individual blocks are so arranged in groups that the image points of the markings assigned to one group coincide in sequence with the hole corresponding to the same detector when the variable irradiation conditions at the storage layer are adjusted by the beam deflecting means.

The variable irradiation conditions are produced by shifting the projection center of the image diagonally to the axis of the system.

The detecting means comprises a plurality of semiconductor detectors and the storage layer has a plurality of adjusting marks located outside the blocks in a manner whereby the image points of individual adjusting marks impinge upon corresponding ones of the detectors under specific irradiation conditions adjusted by the deflecting means.

The detecting means comprises a television camera having another electron beam, and the storage layer has adjusting marks for correcting the beginning of each line of markings. The deflecting means converts the image points of the markings of the correspondingly irradiated blocks in the storage layer and intermediately stored linearly therein into sequential signals relative to time and corresponding to the spaces between the image point and the adjusting marks for correcting the beginning of each line.

The adjusting marks are so arranged that their image points which are intermediately stored in the storage means are scanned by the other electron beam at a selection depending upon position to produce adjusting signals for the deflecting means.

In order that the invention may be readily carried into effect, it will now be described with reference to the accompanying drawings, wherein.

Figure 1:
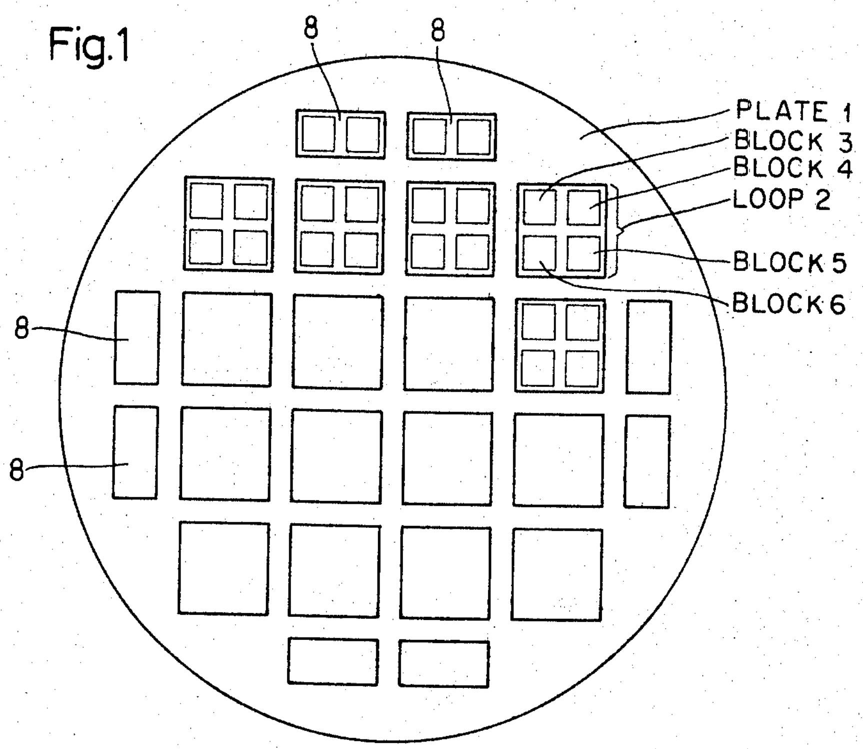
FIG. 1 is a schematic diagram for explaining some terms utilized herein.
Figure 2:
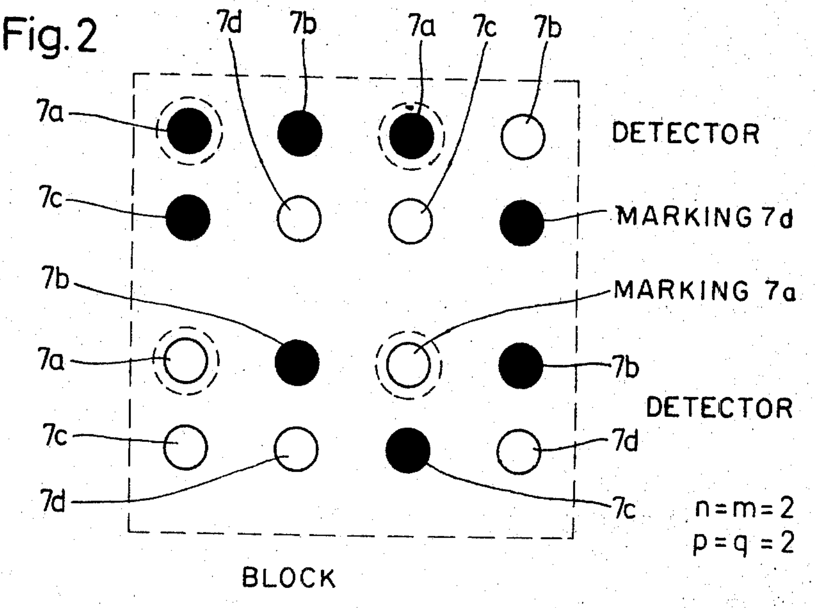
FIG. 2 is a schematic diagram for explaining other terms utilized herein.

FIGS. 1 and 2 illustrate an appropriate arrangement of markings defining information elements on the storage layer. The storage layer comprises a carrier plate 1 on which the markings are produced by known processes such as, for example, contamination. The carrier plate 1 may thus comprise, for example, a metal mesh, which is advantageous to mechanical stability and heat removal. The mesh is covered, for example, with carbon foil which is transparent to electrons and which contains the markings. The carrier plate 1 may have a diameter of 1 mm., for example.

All the dimensions indicated herein are given only by way of example. The markings are located in the mesh loops, one of which is indicated as 2 in the embodiment of FIG. 1. The loop 2 contains a plurality of blocks 3, 4, 5 and 6. The size of the loops depends, for example, upon the mechanical stability and the heat dissipation, which must be ensured by the scanning particle beam with regard to protecting the storage layer from damage. The peripheral length of the loop may comprise, for example, 50 microns.

Because of the optical magnification provided by the particle beam, the blocks are so rated during projection that their magnified image fits the detector system exactly. This means that the magnified image of the corresponding irradiated block is not much larger, but also not much smaller, than the detector system, so that when all the detectors are utilized such as, for example, when a unit similar to a television camera is used and utilizes the entire storage area, all the image points may be read.

As illustrated in FIG. 2, which illustrates one block of FIG. 1, each block is subdivided into groups of markings. The arrangement of the markings into groups is so effected that the markings of one group are supplied to the same detector at variable radiation conditions. As hereinbefore mentioned, the arrangement of the individual markings may be so stacked that during the provision of sequential images, one or more markings are skipped. This results in additional space for the individual detectors of the detector system. Thus, for example, the markings 7*a* may first be projected, the markings 7*b* may next be projected, the markings 7*c* may be projected third, and the markings 7*d* may last be projected upon each of the four detectors of the block of FIG. 2.

Figure 3:
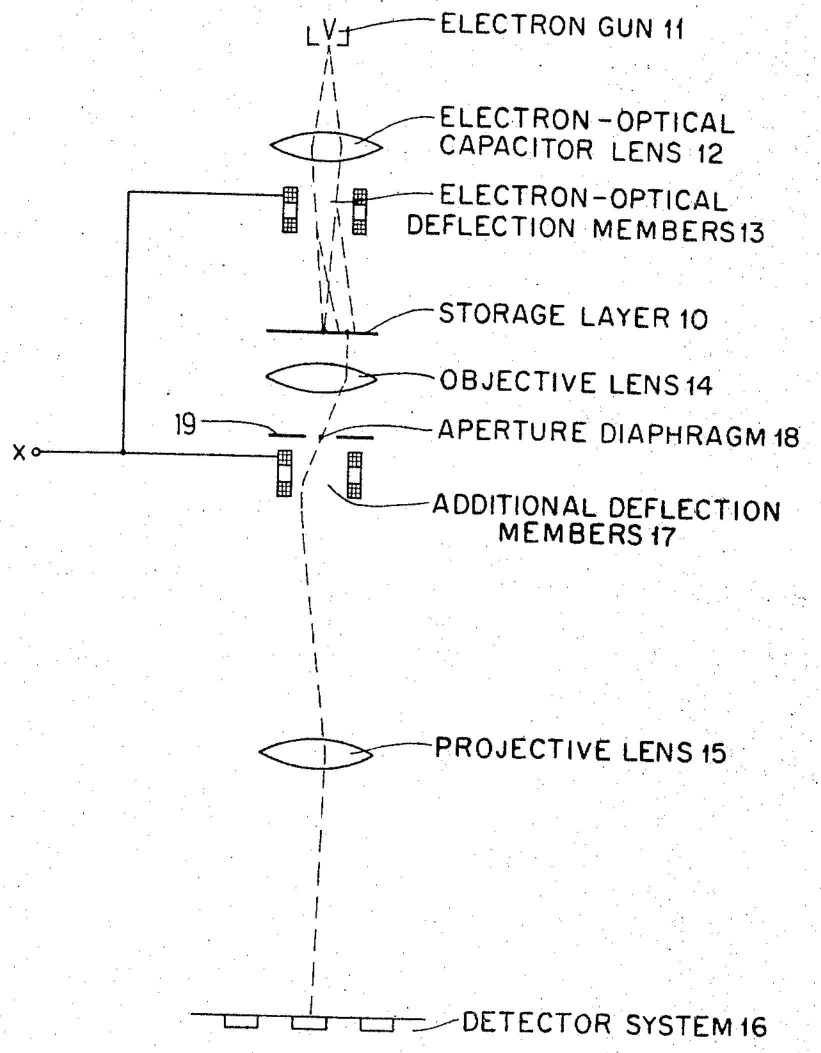
FIG. 3 is a schematic diagram of the path of the electron beam during conventional irradiation projection.

A storage layer 10, as shown in FIG. 3, is provided with the markings arranged in the aforedescribed manner. The storage layer 10 is postioned in a conventional beam path for electron-optical irradiation of an object or specimen. The system of FIG. 3 includes an electron gun for producing an electron beam. The electron beam is projected upon the storage layer 10 as a beam probe, via an electron-optical capacitor lens 12. The electron-optical capacitor lens 12 is generally an electromagnetic poleshoe lens. The beam probe has a cross-section which is such that one block, as illustrated in FIG. 1, is irradiated at a time, depending upon the excitation or energization of the electron-optical deflection members 13.

An objective lens 14 and a projective lens 15 produce a magnified image of the corresponding irradiated groups, in the plane of a detector system 16. Additional deflection members 17, which are operated in synchronism with the deflection members 13, ensure that during the projection of various groups the corresponding image of the corresponding area or region of the storage layer 10 occupies the same position in the plane of the detector system 16. The synchronous operation of deflection members is discussed by Zworykin et al. in "Electron Optics and the Electron Microscope" on page 98 and thereafter. The deflection members 17 are so energized or excited and the objective lens is so positioned that, essentally, an oscillation of the beam occurs around a point 18 in the plane of an aperture diaphragm 19.

Figure 4:
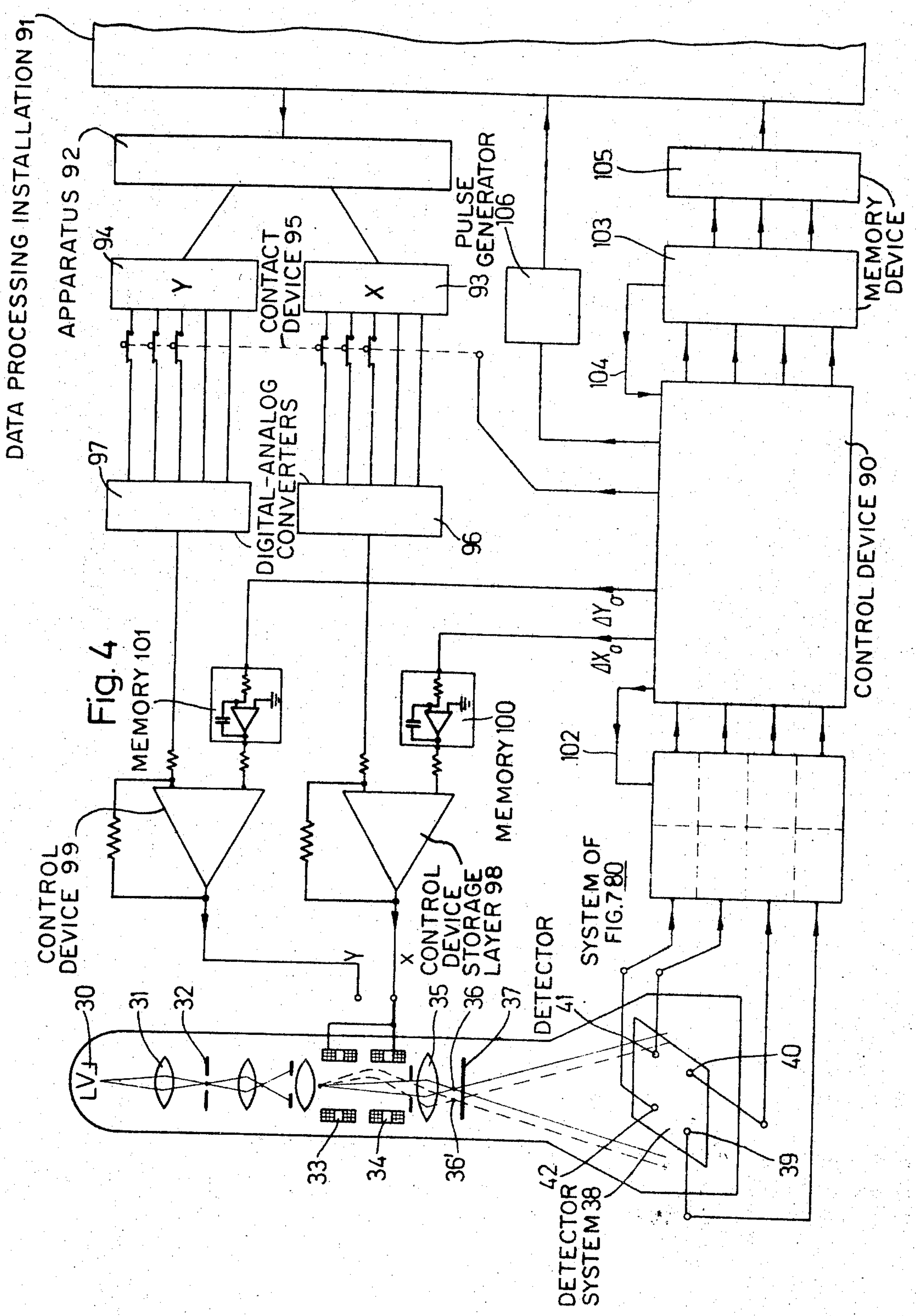
FIG. 4 is a schematic block diagram of a shadow microscopic beam path and a control system for such path.

The deflection members 13 and 17 may obviously include additional windings or plates to ensure a deflection in the vertical or Y direction relative to the deflection of X direction of the windings illustrated. Furthermore, as indicated in FIG. 4, it is customary to utilize for deflection in each of the two directions two deflection windings or plate pairs positioned following each other in the direction of the beam. The deflection windings or plate pairs produce deflections in two opposite directions from the axis of the apparatus in a single plane, in order to avoid disturbing or interfering influences of the beam which are caused by the opening error of the electron-optical lenses provided on the irradiated side.

The system of FIG. 4 produces a shadow microscopic beam path. A shadow microscopic beam path is described, for example, on page 110 of the aforedescribed Zworykin et al. text. The apparatus of FIG. 4, which may comprise an electron microscope, contains a cathode 30 for the production of the electron beam. A lens 31 and an aperture diaphragm 32 produce a fade-out of a portion of the electron beam across the cross-section thereof with at least almost constant intensity distribution. The electron beam is focused by capacitor lenses upon a beam probe.

The beam deflection, or beam path represented by broken lines in FIG. 4, produced by pairs of deflection windings 33 and 34, is so rated that the projection center 36 produced behind the last lens 35, is laterally shifted to position 36'. This results in variable blocks of markings on the storage layer 37 being projected and magnified by shadow microscopy. When the storage layer of FIG. 1 is utilized, it is possible to project the individual markings in such sequence on a single corresponding detector that the plane of the detector has sufficient space to accommodate the required number of semiconductor detectors. This is made possible by stacking the markings of the individual groups and by an appropriate control of the deflection members 33 and 34, as well as an appropriate deflection control in Y directions.

FIG. 4 illustrates only four selected detectors 39, 40, 41 and 42 of the detector system 38. The detectors 39 to 42 function to produce the setting signals and serve for information at another point of time, as hereinafter described. As hereinbefore mentioned, it is necessary for statistical reasons, and in order to provide a clear signal, that during each projection of a marking on the storage layer, a specific number of electrons be permitted to reach the corresponding, assigned or subordinate detector.

Figure 5:
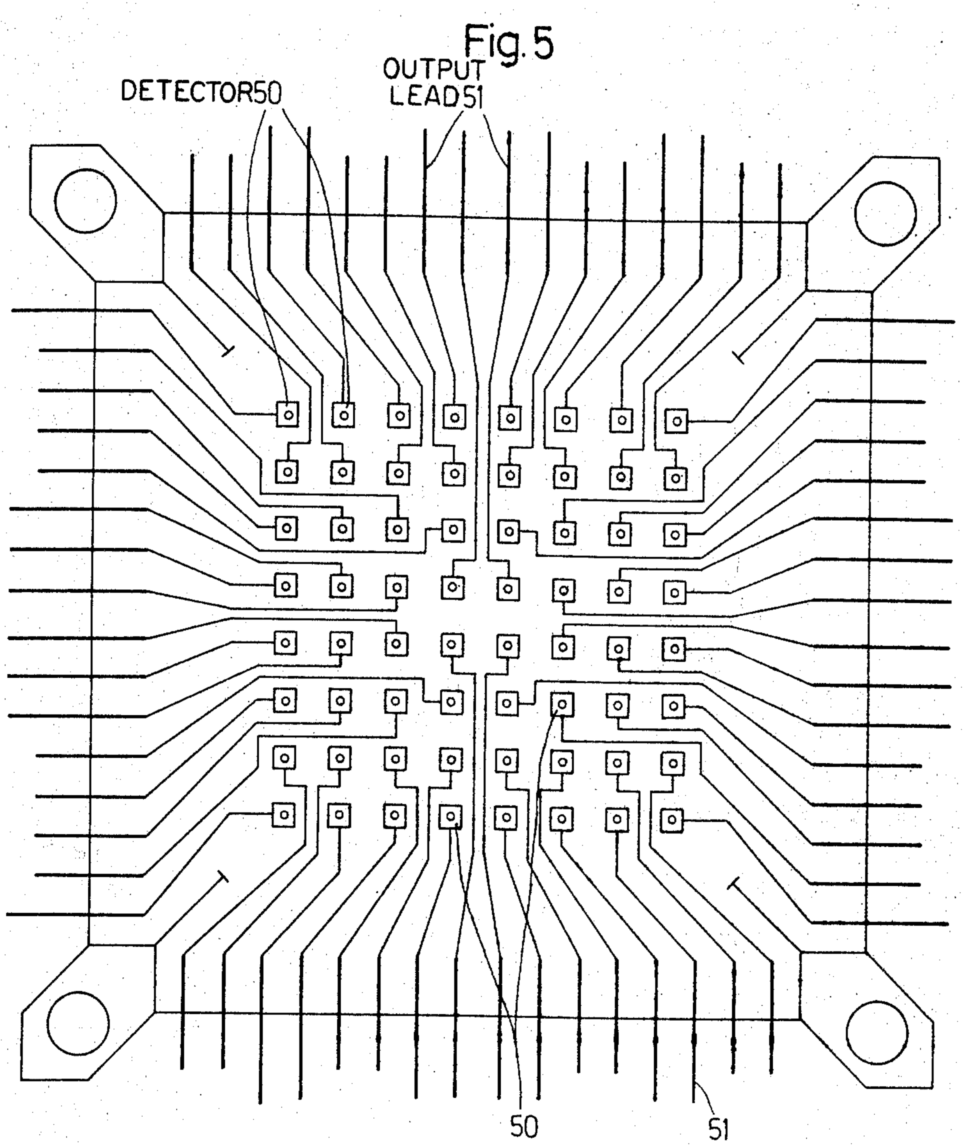
FIG. 5 is a schematic diagram of an exemplary embodiment of a detector system utilizing semiconductor detectors.
Figure 6:
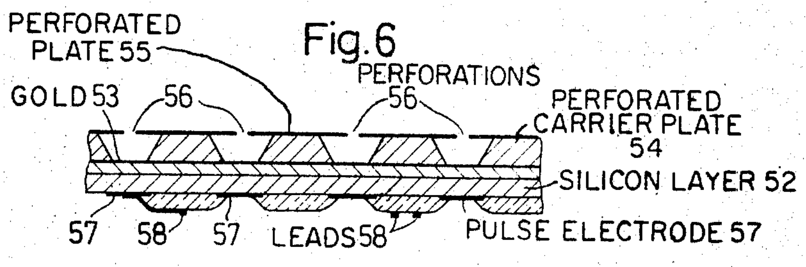
FIG. 6 is a cross-sectional view of part of FIG. 5.

FIGS. 5 and 6 illustrate an example of a detector device comprising semiconductor detectors. Individual detectors 50 are provided in a matrix in a single plane. Each of the detectors 50 has a separate output lead 51. As illustrated in FIG. 6, the individual detectors 50 may comprise a thin gold layer 53 positioned on a p-n silicon layer 52. The gold layer 53 has a perforated carrier plate provided thereon. The perforations of the carrier plate 54 define the detector inputs. A perforated plate 55 is mounted on the perforated carrier plate 54. The perforated plate 55 is provided by vapor deposition or may be provided separately as a perforated foil. The perforated plate 55 has a plurality of perforations 56 formed therethrough. The perforations 56 of the perforated plate 55 permit the images of the individual markings of the storage layer 10 or 37 to reach the inputs of the detectors in accordance with radiation conditions. The output signals of the detectors are provided via pulse electrodes 57 and leads 58.

In the detector device, $m=n=4$ in accordance with the aforementioned definition. Each fourth marking point is read in parallel. Therefore, 4 times $4=16$ words are stacked in the block. The openings or perforations 56 through the perforated plate 55 are smaller than 4 times the distance between them. Furthermore, $p=q=8$. That is, a word having a length of 8 times $8=64$ markings is read in parallel. The entire block of data contains 16 times $64=1024$ markings.

Figure 7:
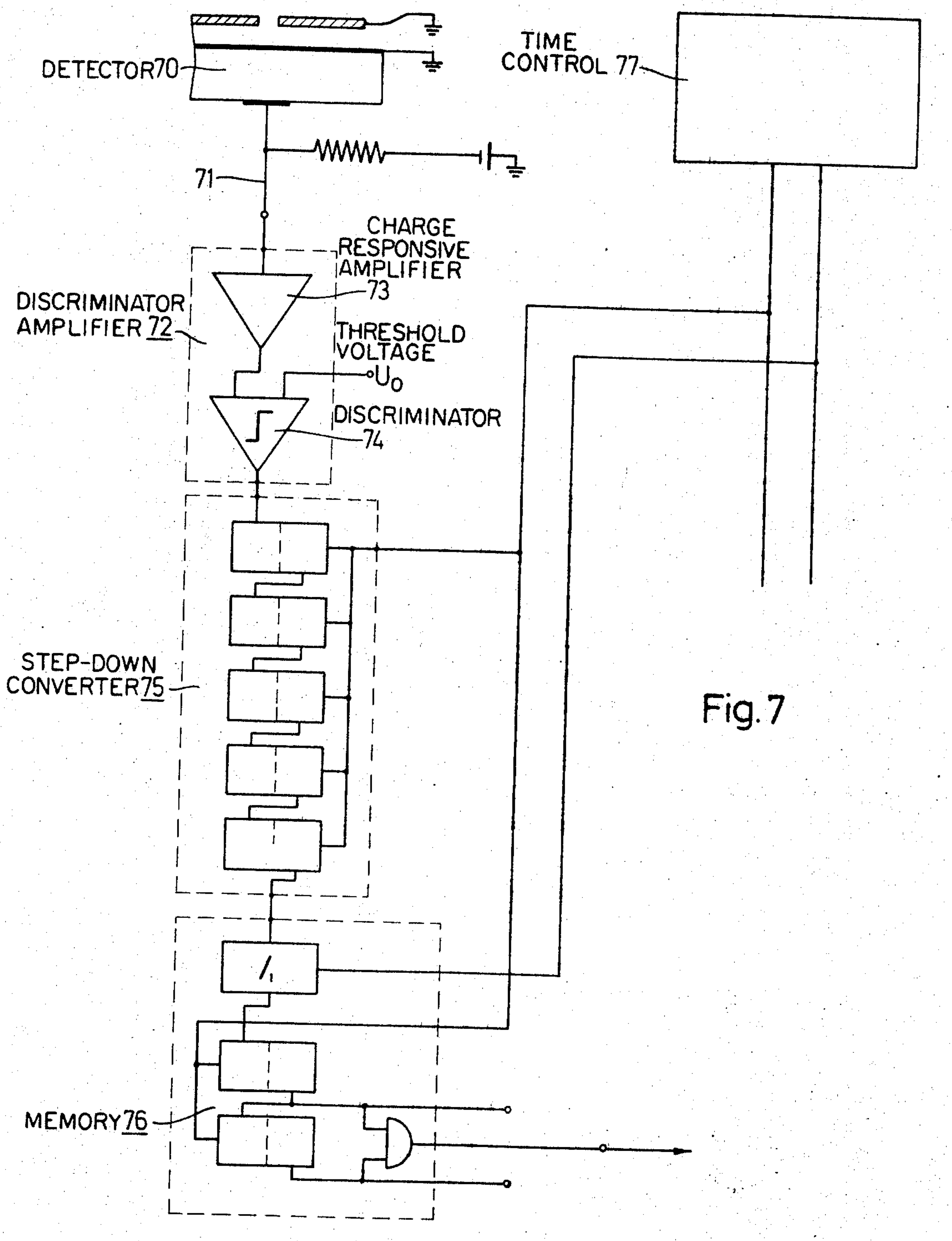
FIG. 7 is a schematic block diagram of a circuit component of the detector system.

In the preferred embodiment of the data storage system of the invention, the output leads 51 (FIG. 5) of the detectors are connected to a circuit arrangement shown in FIG. 7. The circuit arrangement of FIG. 7 functions to clearly differentiate the signals derived from the markings, from the noise level. In FIG. 7, a single detector 70 has an output lead 71 which is connected to the input of a discriminator amplifier 72. The discriminator amplifier 72 comprises a charge responsive amplifier 73 and a discriminator 74. The charge responsive amplifier 73 is commercially available, as indicated in the Siemens Brochure Eg 5/53 entitled "Strahlungsmessplätze für Impulsspektrometrie mit Halbleiter-Detektoren," or "Radiation Measuring Localities For Pulse Spectrometry With Semiconductor Detectors." A threshold voltage $U_0$ is applied to the discriminator 74. The discriminator 74 is so rated that a specific signal is supplied to a converter 75 when said converter has a minimum voltage value. The discriminator 74 may comprise the same circuit as the comparator 21 of FIG. 11 of German patent application No. P 19 02 668.7, filed Oct. 27, 1969 and entitled "Korpuskularstrahl-Bearbeitungseinrichtung," or "Particle Ray Processing Apparatus."

The step-down converter 75 is connected to the output of the discriminator 74 of the discriminator amplifier 72. The production of a signal by the discriminator 74 prevents the transmission of interfering noise signals. The converter 75 comprises a plurality of flip flop or bistable multivibrator stages connected in series with each other. A bistable multivibrator or flip-flop is well known in the art, as indicated on pages 31 and 32 of "Lexikon der Hochfrequenz-, Nachrichten- und Elektrotechnik," or "Dictionary of High Frequency, Communications and Electrical Technology," Rint, 1959. The output of the converter 75 is connected to the input of a memory 76. The memory 76 comprises a plurality of flip-flop or bistable multivibrator stages connected in series with each other. The memory 76 functions to count the electrons impinging upon the detector and to supply a signal at its output, when, within a predetermined period, a minimum number of electrons impinges upon said detector. The minimum number of electrons is selected by considering the irradiation density and the contrast of the markings, so that the statistical reading error for yes-no decisions is minimal. The memory 76 may comprise a plurality of integrators, including operational amplifiers, of the type illustrated in circuit 20 of FIG. 11 of the aforedescribed German patent application. A time control 77 controls the timing operation of the system of FIG. 7 from a central point.

The system of FIG. 7 is indicated at 80 in FIG. 4 and is connected to the outputs of the detectors 39, 40, 41 and 42. The outputs of the detectors 39 to 42 function to provide signals corresponding to markings stored on the storage layer 37, which are utilized as setting or data information signals.

Figure 8:
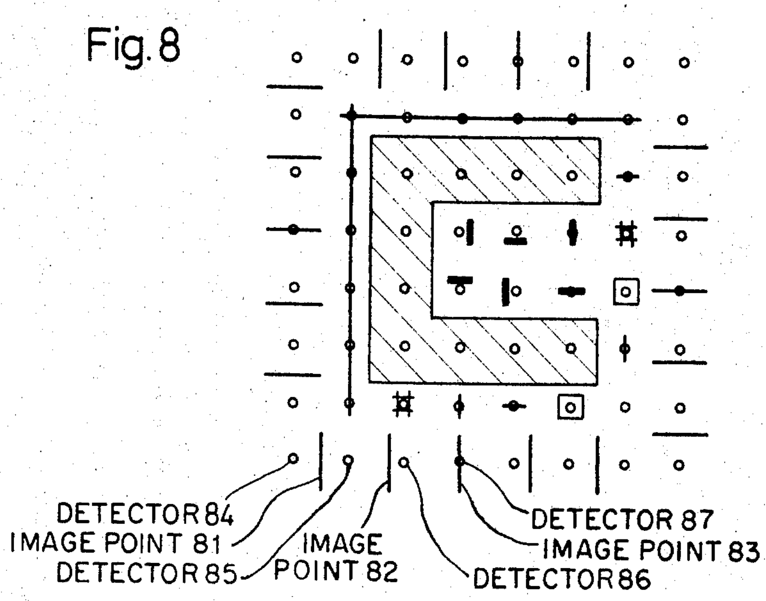
FIG. 8 is a schematic diagram of a storage layer illustrating a preferred arrangement of setting marks.

The arrangement of the setting marks on the storage layer 37 is of importance. An example of such an arrangement, which constitutes a type of coordination pattern, is illustrated in FIG. 8. In FIG. 8, the setting marks are verified by line markings. The line markings include image points 81, 82 and 83. In FIG. 8, small circles indicate the positions of the detectors in the detector system 38 (FIG. 4). The detectors are represented by the four detectors 39, 40, 41 and 42 in FIG. 4. Four detectors 84, 85, 86 and 87 are shown in FIG. 8.

In order to understand the principle of the coordinating pattern of FIG. 8, it is sufficient to observe the indicated setting marks or markings and the detectors. The selected arrangement ensures that each position of the storage layer 37 (FIG. 4), or rather, each relative position between the projection center 36, the storage layer 37 and the detector system 38 (FIG. 4) produces very specific signals in the selected detectors. This is therefore a true indication of the respective or corresponding position in the aforedescribed definition.

The position indicated in FIG. 8 is characterized by the fact that only the image of the setting mark 83 impinges, in magnified condition, upon the detector 87. The detectors 84, 85 and 86 shown in FIG. 8 are not irradiated. If, on the other hand, the storage layer 37 (FIG. 4) were to be shifted by a quarter distance between two adjacent setting marks to the right, the image of the setting mark 82 would impinge upon the detector 86.

Accordingly, the coordination is provided in vertical direction to the sequence of the marks 81, 82 and 83 (FIG. 8), so that a control device 90 of FIG. 4 is supplied with signals which clearly transmit the corresponding or respective relative position of the projection center 36, the storage layer 37 and the detector system 38 relative to each other. The other patterns sharpen the recognition by preventing incidental interferences by redundance, and in order to permit recognition of even greater position deviation.

In the embodiment of FIG. 4, an adjustment or setting is provided during each change of markings in the irradiated blocks, by a variation at the energization or excitation of the deflection members 33 and 34. A data processing installation 91 supplies an address to be read, via apparatus 92, which contains an X component 93 and a Y component 94. The addressing is undertaken in a manner whereby setting marks on the storage layer 37 provided for an adjustment of the first positions of the address which form the main address, and which are therefore coordinated to the main address, and thus to the corresponding block, are projected upon the detector system 38.

First, a contact device 95, in the path of the sub-address, is opened by a command signal supplied by the control device 90. When the contact device 95 is opened, digital-analog converters 96 and 97 are provided with only the main addresses in the X and Y directions. The main addresses are supplied to control devices 98 and 99, which are simultaneously supplied with correction signals $\Delta X_0$ and $\Delta Y_0$ from control device 90. The correction signals $\Delta X_0$ and $\Delta Y_0$ are previously stored in memories 100 and 101. There are therefore electrical magnitudes in the memories 100 and 101 which represent the sum of the corrections executed during the scanning of the previous blocks. Thus, during each setting or adjustment, the previously executed adjustment or setting functions as a reference magnitude.

The contacts of the contact device 95 are closed only after the new adjustment or setting is executed by a corresponding variation in the energization or excitation of the deflection members 33 and 34, in FIG. 4, as well as the deflection members for the deflection in Y directions. When the contacts of the contact device 95 are closed, there is another variation or change in the energization or excitation of the deflection members 33 and 34 which causes the electron beam to project the markings of the newly adjusted block onto the detector plane in a magnified image or condition.

In addition to providing zero point correction, the control device 90 of FIG. 4 is also utilized to control the processes of the discriminator-magnifier 80, which is the system of FIG. 7, with regard to time. This is accomplished via a lead 102. Furthermore, a double reading is initiated, in case a memory device 103 supplies an error signal via a lead 104. In order to control errors, the data in the storage layer 37 is redundantly coded, in a known manner, to provide control possibilities such as, for example, a specific square sum, or the like. A memory device 105 then reads the partial data or information corresponding to one information, all together, and transmits them to the data processing installation 91. The delivery of this information is controlled by a pulse generator or clock 106, in order to provide an adjustment for variably long periods, until the storage of the information in the memory device 105.

In the disclosed embodiment of the invention, the irradiated block provides only a portion of the information simultaneously, that is, in parallel, to the detectors, because of the interlocking or interleaving of the markings. Thus, only a fraction of the irradiated electron is utilized. In another embodiment of the invention, all the markings are projected simultaneously upon the storage plate of a video tube and are sequentially scanned in said tube by another electron beam. The scanning period is thus added to the time required for the simultaneous intermediate storage of all the image points determined by the statistical fluctuations.

The video tube embodiment is preferred when longer information units comprise a plurality of markings. This embodiment requires an adjustment correction, due to the fact that the storage layer, for example, and the control circuitry for the deflection members are subjected to inadvisable drift phenomenon over long periods of time. A sensible embodiment of the adjusting marks results in the fact that the correction of the image does not have to be as exact in this embodiment, since the scanning process of the homogeneous storage plate may be related to a correction of the positioning.

Figure 9:
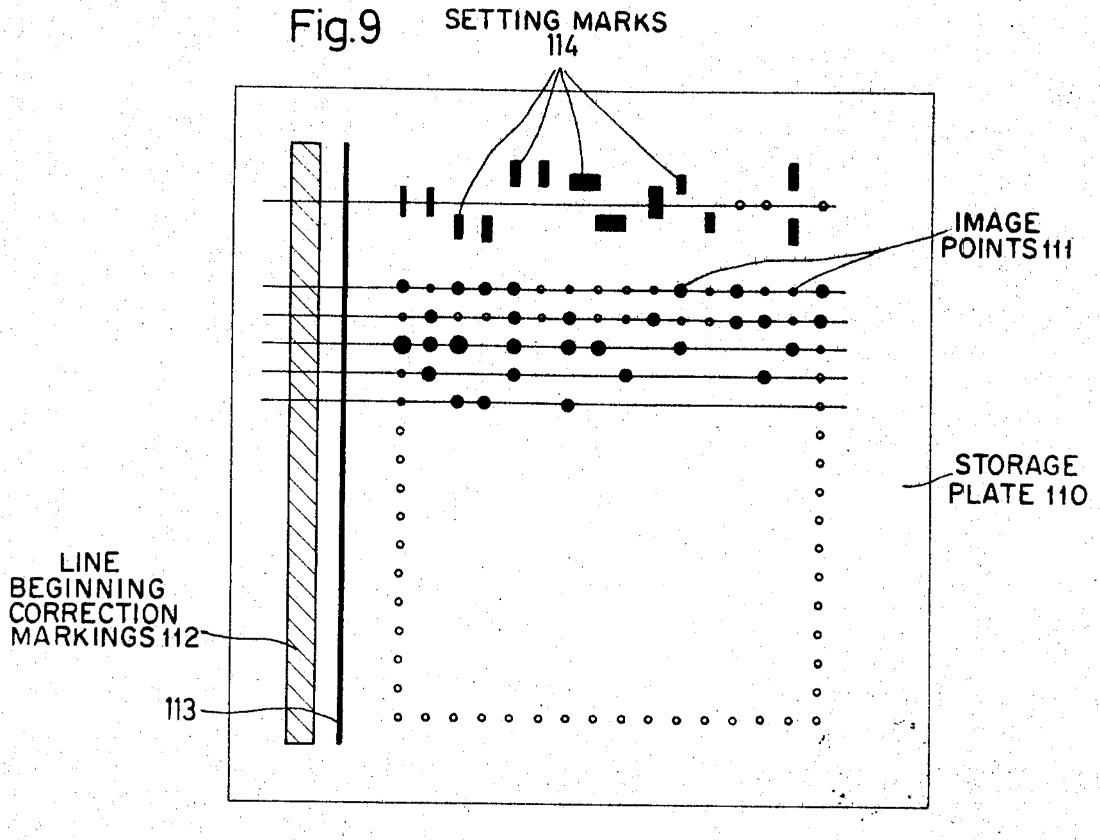
FIG. 9 is a schematic diagram illustrating an embodiment of the system of the invention which utilizes a television camera.

FIG. 9 illustrates the reading of the adjusting or setting marks. The reading of the adjacent or setting marks is done during the line scanning of image points 111 of the block. The image points 111 are vertically stored in the storage plate 110. Markings 112 and 113 are for the correction of the beginning of a line. The line beginning correction marks 112 and 113 supply a reference signal for the image points 111, which image points are linearly positioned and are converted by the video camera into time sequence signals. The time sequence signals correspond to the hozinotal distances of the image points 111 from the line beginning correction markings 112 and 113. Setting marks 114 are positioned in the first line of the scanning pattern; upon scanning they provide different signal sequences in dependence upon their vertical position, as shown in FIG. 9. Thus, the setting marks 114 produce adjusting signals for those deflection members above the storage layer which provide electron beam control in vertical directions.

Figure 10:
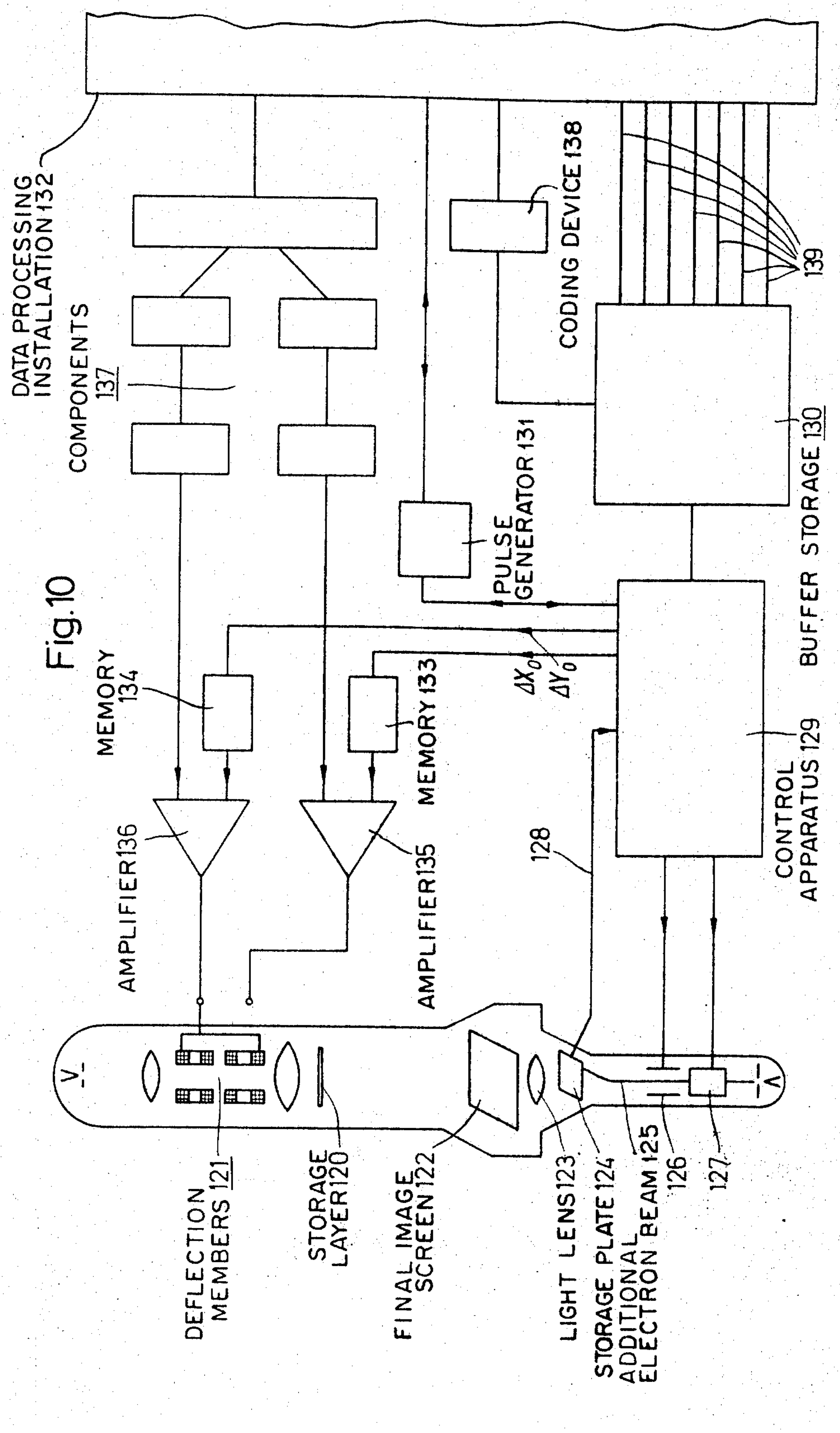
FIG. 10 is a schematic block diagram of an embodiment of the system of the invention which utilizes a television camera.

FIG. 10 shows a data storage system in which the system includes a device similar to a television or video camera. A storage layer 120 and deflection members 121 are positioned adjacent components for producing and focusing the electron beam. The deflection members 121 function to select the respectively irradiated blocks of markings on the storage layer 120. A final image screen 122 is provided at the lower end of the upper part of the apparatus. The final image screen 122 is a transparent screen, so that an intermediate storage of the image points of the markings of the correspondingly irradiated block is provided on a storage plate 124, positioned beneath said final image screen, via a light or fiber lens 123.

The system of FIG. 10 includes means for producing and bunching an additional electron beam 125 which, under the effect of two deflection members, functioning in mutually perpendicular directions, scans the intermediately stored image points on the storage plate 124. Accordingly, electrical signals corresponding to the data or information on the storage plate 124, and thereby also on the storage plate 120, are supplied to control apparatus 129, via a lead 128 in a specific time sequence.

The control apparatus 129 supplies a release signal for reading a buffer storage 130 to a data processing installation 132 via a pulse generator or clock 131, as soon as the other electron beam 125 has completed its scanning. Such a signal is necessary, for example, when an interfering deviation of the relative position of the projection center, storage layer and storage plate is caused by drifting of said storage layer or by another phenomenon, and an adjustment or setting must then first be effected before the computer can read the information. This adjustment, also, is provided with the assistance of the control apparatus 129, in a manner similar to that described with reference to the embodiment of FIG. 4.

As shown in FIG. 9, the setting marks on the storage layer 120, are utilized to integrate the deviations $\Delta X_0$ and $\Delta Y_0$ from predetermined position values in memories 133 and 134 (FIG. 10). The corresponding control signals are supplied to the deflection members 121 for the scanning electron beam, via amplifiers 135 and 136. Components 137 of FIG. 10 correspond in structure and operation to the components 92, 93, 94, 95, 96 and 97 of FIG. 4, and are therefore not described with reference to FIG. 10. These components function to adjust the correspondingly irradiated block markings on the storage layer 120.

When the pulse generator or clock 131 of the data processing installation 132 signals that the entire information or data has been stored in the buffer register 130, said data processing installation scans, via a coding device 138, the required word information and receives the appropriate signals via signal leads 139.

Considerable difficulties associated with electron-optical data storage are the drift and statistical deviations or fluctuations with a small number of electrons. The scope of the invention provides for the automatic correction of image displacements caused by drifts, in time intervals with the assistance of setting marks. In order to enhance the reliability of the system in avoiding errors, with respect to statistical current density fluctuations, error detecting devices may be utilized, particularly via additional square sum quotations which initiate a second reading. These measures are helpful when the slightest possible number of electrons are utilized per marking, in order to provide short or brief access times. Other difficulties are caused by faults with the foil, which may be caused for example, by microscopic contamination of the carrier foil.

If the aforedescribed errors are recognized during the recording or writing of the data or information, the markings which are to be located at the error point must be written at a substitute location. The carrier plate 1 (FIG. 1) must therefore include substitute fields 8 (FIG. 1) and a list of errors. When it becomes necessary to store information with the utmost reliability against errors, multiple storage must be provided at various localities. A square sum quotation determines which storage location contains error-free information, and only such locations are considered. When this method is utilized, however, the storage area may be utilized at less than 50%. Distortion errors caused by the deflection members, as well as by the opening errors of the lenses, may be compensated, for example, by a compensation listing of the marking arrangement on the carrier plate, by curving or deflecting the scanning paths during the intermediate video storage, or by electron-optical compensation. Each of the components of each of FIGS. 1 to 10, is a component which is well known in the art and which performs the functions ascribed to it in the manner described herein.

While the invention has been described by means of specific examples and in specific embodiments, I do not wish to be limited thereto, for obvious modifications will occur to those skilled in the art without departing from the spirit and scope of the invention.

I claim:

1. A data storage system, comprising a transparent storage layer having markings each representing a corresponding data element, said storage layer comprising a plurality of blocks each having a plurality of markings;

beam means for irradiating said storage layer with an electron beam in a shadow microscopic beam path;

beam deflecting means ahead of the storage layer in the beam direction between said beam means and said storage layer for laterally shifting the projection center of said shadow microscopic beam path and thereby deflecting said electron beam to predetermined areas of said storage layer; and detecting means positioned on the opposite side of said storage layer from said deflecting means, said electron beam having a predetermined cross-section in the plane of said storage layer covering the area of any one of a plurality of blocks of markings therein for projecting selectively one of said blocks in magnified condition onto the plane of said detecting means, said detecting means providing separate reading of the image points of the individual markings corresponding to the irradiated block of said storage layer, the magnification of the projected block remaining constant during the projection of all the blocks of said storage layer and being selected so that the image of each of the blocks is specifically read by said detecting means.

2. A data storage system as claimed in claim 1, wherein said detecting means comprises a television camera having another electron beam, and wherein all the image points of the correspondingly irradiated blocks are simultaneously stored and are sequentially scanned in time by said other electron beam.

3. A data storage system as claimed in claim 1, wherein the variable irradiation conditions are produced by shifting the projection center of the image diagonally to the axis of the system.

4. A data storage system as claimed in claim 1, wherein said detecting means comprises a matrix of semiconductor detectors positioned adjacent each other in a single plane and the images of operating in parallel.

5. A data storage system as claimed in claim 4, further comprising a perforated plate having a hole formed therethrough for each detector of said detecting means, said perforated plate being positioned ahead of the detecting means in the beam direction between said storage layer and said detecting means, the markings within the individual blocks being so arranged in groups that the image points of the markings assigned to one group coincide in sequence with the hole corresponding to the same detector when the variable irradiation conditions at said storage layer are adjusted by said beam deflecting means.

6. A data storage system as claimed in claim 1, wherein the storage layer has adjusting marks corresponding to the individual blocks, and said adjusting marks produce adjusting signals in the detecting means during the transition of the projection of one block to another.

7. A data storage system as claimed in claim 5, wherein said detecting means comprises a plurality of semiconductor detectors and said storage layer has a plurality of adjusting marks located outside the blocks in a manner whereby the image points of individual adjusting marks impinge upon corresponding ones of the detectors under specific irradiation conditions adjusted by said deflecting means.

8. A data storage system as claimed in claim 6, further comprising a storage plate, and wherein said detecting means comprises a television camera having another electron beam, and said storage layer has adjusting marks for correcting the beginning of each line of markings, said deflecting means converting on the storage plate the image points of the markings of the correspondingly irradiated blocks in the storage layer and intermediately stored linearly therein into sequential signals relative to time and corresponding to the spaces between the image points of the adjusting marks for correcting the beginning of each line.

9. A data storage system as claimed in claim 8, wherein the adjusting marks are so arranged on the storage layer that their image points which are intermediately stored on the storage plate are scanned by the other electron beam at a selection depending upon position to produce adjusting signals for said deflecting means.

References Cited

UNITED STATES PATENTS

| | | | |
|---|---|---|---|
| 2,937,312 | 5/1960 | Schlesinger | 315—8.5 |
| 2,965,884 | 12/1960 | Henderson | 328—123 |
| 2,981,861 | 4/1961 | Dawirs | 315—8.5 |
| 2,674,704 | 4/1954 | Weimer | 328—124 X |
| 2,687,492 | 8/1954 | Szegho et al. | 328—124 X |
| 2,717,976 | 9/1955 | Baker | 328—124 X |
| 2,496,633 | 2/1950 | Llewellyn | 315—8.5 |
| 2,974,295 | 3/1961 | Rydbeck et al. | 315—8.5 X |
| 3,072,889 | 1/1963 | Willcox | 340—173 LM |
| 3,371,324 | 2/1968 | Sinoto | 340—173 LM |

STANLEY M. URYNOWICZ, Jr., Primary Examiner

U.S. Cl. X.R.

315—8.5; 328—124; 340—173 LM